United States Patent

Fifield et al.

[11] Patent Number: 6,019,869
[45] Date of Patent: Feb. 1, 2000

[54] LAMINATING MACHINE

[76] Inventors: Steven Fifield, 5A Liverpool Street, Trentham, Wellington; Bruce Sarratt, 242 Dowse Drive, Lower Hutt, Wellington, both of New Zealand

[21] Appl. No.: 08/937,840

[22] Filed: Sep. 25, 1997

[30] Foreign Application Priority Data

Sep. 25, 1996 [AU] Australia ................................ 65814/96

[51] Int. Cl.⁷ .................................................. B42C 9/00
[52] U.S. Cl. ...................... 156/477.1; 156/492; 156/493; 156/212; 156/216; 156/227
[58] Field of Search ..................... 156/480, 479, 156/477.1, 212, 216, 227, 478, 481, 482, 492, 493

[56] References Cited

U.S. PATENT DOCUMENTS

| 1,776,427 | 9/1930 | Glass | 156/480 |
| 2,937,689 | 5/1960 | Peterson | 156/492 |
| 4,478,664 | 10/1984 | Elias | 156/216 |
| 5,609,709 | 3/1997 | Doumae et al. | 156/216 |

FOREIGN PATENT DOCUMENTS

0603498A1 6/1994 European Pat. Off. ........ B29C 63/04

Primary Examiner—Richard Crispino
Assistant Examiner—Linda L. Gray
Attorney, Agent, or Firm—Zarley, McKee, Thomte, Voorhees & Sease

[57] ABSTRACT

A laminated bench top forming machine including first and second folder bars where the second folder bar includes a resilient portion. The first folder bar folds a laminate, which is on a surface, around a curved edge of the surface. The second folder bar then acts against the folded portion of the laminate and against an area of the curved edge such that as this occurs the resilient portion of the second folder bar contracts and causes the second folder bar to move around the curved edge such that the second folder bar applies a force against at third part of the surface to form a laminated bench top.

5 Claims, 1 Drawing Sheet

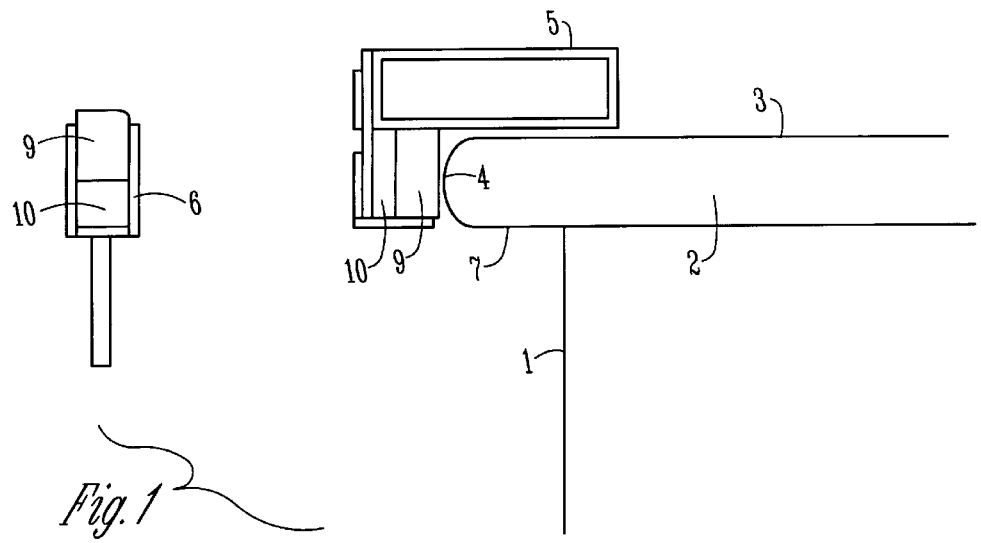
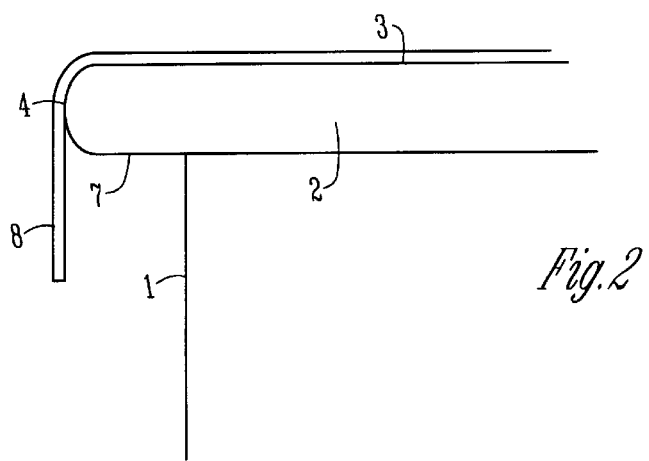
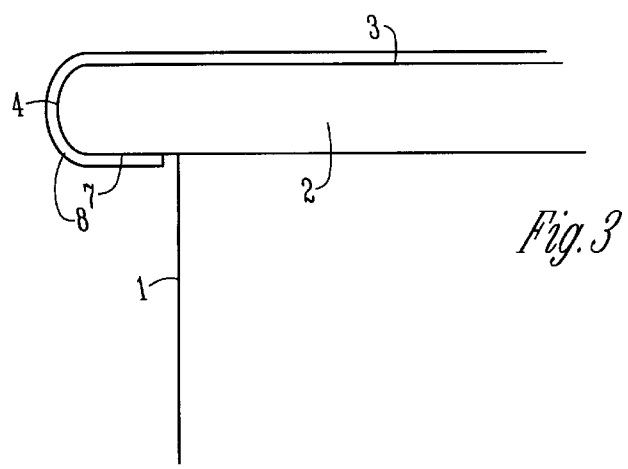

LAMINATING MACHINE

TECHNICAL FIELD

This invention relates to laminating means. In particular, one preferred form of the invention relates to means for applying a laminate to a curved surface by folding the laminate around the surface.

BACKGROUND ART

It is known to use post-forming machinery to apply a laminate such as FORMICA™ to a wooden surface for making kitchen bench-tops or the like. A problem faced by manufacturers is that it can be difficult to provide a suitable force against the laminate to push it against the wooden surface at points were the surface is curved. Such points of curvature may be intended for use as a bench-top edge for facing inwardly of a kitchen area. It is therefore an object of at least one form of the present invention to go at least some way towards addressing the above problem.

European patent specification No. 0603498 A1 describes a method and apparatus for forming trim panels comprising a substrate with a cover sheet laminated thereto. The panels are intended for use in covering the internal surfaces of automobile doors or the like. In the European specification the apparatus has a single folding means for turning the cover sheet in a curved path around the substrate. The disadvantage of using only one folding means is that an optimum force cannot be readily applied to push the cover sheet against the substrate at all necessary points of the curved path. The use of a less than optimum force can result in the cover sheet coming unstuck at a latter date. Accordingly, the method and apparatus of the European specification does not address the above mentioned problem.

SUMMARY OF THE INVENTION

According to one aspect of the invention there is provided a laminating machine, comprising first folding means and second folding means, the laminating machine being formed such that when it is in use the first folding means can be caused to directly contact a laminate to cause at least a portion of the laminate to be forced against a surface which is distinct from the first folding means to fold the laminate around a first portion of the surface, the laminating machine being formed such that the second folding means can then act against the portion of the laminate which has been folded and force it against a second portion of the surface to provide further folding of the laminate, the laminating machine being formed such that when it is in use the first and second folding means can act against the laminate independently of one another.

Preferably the first and/or second folding means comprise contacting means for contacting the laminate, the contacting means comprising resilient means to provide an enhancement of force acting against the laminate to cause folding of the laminate when the laminating machine is in use.

Preferably the first and/or second folding means comprise contacting means for contacting the laminate, the contacting means comprising resilient means to provide an enhancement of force acting against the laminate to cause folding of the laminate when the laminating machine is in use, the laminating machine being formed such that when it is in use the first folding means can move against the laminate to fold it around the first portion of the surface, and at least a portion of the second folding means can move laterally against the laminate and then drop beneath the surface due to contraction of the resilient means to cause the laminate to be folded against the second portion of the surface.

While the laminating means has been defined above with reference to the laminate and the surface, the laminate and the surface do not form part of the laminating means.

BRIEF DESCRIPTION OF THE DRAWINGS

Some preferred forms of the invention will now be described by way of example and with reference to the accompanying drawings, of which:

FIG. 1 is a schematic view of a laminating machine suitable for forming bench tops of the laminated variety, FIG. 2 is a schematic view demonstrating a first folding effect which can be produced by the laminating machine, and FIG. 3 is a schematic view demonstrating a second folding effect which can be produced by the laminating machine.

DETAILED DESCRIPTION OF THE INVENTION

With reference to FIG. 1, the lamninating machine comprises a support 1 for supporting a wooden sheet 2 which is to be used as part of a kitchen bench-top. As shown, the sheet 2 is supported in a horizontal orientation and has an upper surface 3 and a curved edge 4. The laminating machine has a first folder bar 5 and a second folder bar 6. The first folder bar 5 is capable of pivoting anti-clockwise down towards the sheet 2 so that it extends both over the upper surface 3 and at least partially around the curved edge 4. The second folder bar 6 is capable of moving laterally along a track to a position immediately adjacent and slightly above a lower surface 7 of the sheet 2.

When the laminating machine is used to form a laminated bench top the wooden sheet 2 is placed on the support 1 as shown in FIG. 1. A planar sheet of laminate, such as FORMICA™, is laid on the wooden sheet 2 so that the planes of the sheet 2 and the laminate are parallel to one another. The laminate is not shown in FIG. 1, although it is positioned so that it extends beyond the curved edge 4 of the wooden sheet 2. To fold the laminate around the curved edge 4 the first folder bar 5 is swung anti-clockwise to force the laminate hard against the upper surface 3 and an upper part of the curved edge 4. This causes folding of the laminate through an angle of approximately 90 degrees as shown in FIG. 2, wherein the laminate is designated by the reference numeral 8.

The laminate is then subjected to further folding by the second folder bar 6. More particularly, the second folder bar is moved laterally to contact the laminate adjacent a lower part of the curved edge 4. The second folder bar 6 pushes the folded portion of the laminate against the lower part of the curved edge 4, and then drops beneath the lower surface 7. The lateral movement positions the second folder bar 6 beneath the laminate such that the laminate is subjected to an upward force which pushes it against the lower surface 7. The second folder bar 6 thus causes the laminate 8 to assume the folded form shown in FIG. 3. More particularly, FIG. 3 shows the laminate folded from the upper surface 3, down around the curved edge 4, and against the lower surface 7. The laminate 8 is thus folded through an angle of 180 degrees by the folder bars 5 and 6, which each act on the laminate independently of one another.

Those skilled in the art will appreciate that laminates such as FORMICA™ must be heated before they can be folded without breaking. Additionally, those skilled in the art will appreciate that the laminate is fixed to the wooden sheet 2 by way of a suitable adhesive. In at least some embodiments of the invention the laminating machine may incorporate means for heating the laminate and/or applying adhesive thereto.

With reference to FIG. 1, the first and second folder bars 5 and 6 each comprise a contacting part for contacting the laminate to cause folding as described above. Each contacting part comprises a hard portion 9, such as a plastic, wooden or metallic material, and a resilient portion 10. The resilient portions 10 may be formed from a synthetic foam-like pad material, although a number of alternative resilient arrangements may suffice. For example, in alternative embodiments of the invention the resilient portion may comprise a spring arrangement or a hydraulic ram. The contacting parts are arranged such that during folding it is each hard portion 9 which makes contact with the laminate. However, the resilient portions 10 are each immediately behind a respective one of the hard portions 9. Those skilled in the art will appreciate that when the folder bars 5 and 6 act against the laminate the resilient portions serve to enhance the contacting force between the laminate 8 and the hard portions 9. This enables a good contact between the laminate 8 and the wooden sheet 2 to facilitate adhesion. Moreover, the resilient portion 10 of the second folder bar 6 enables the associated hard portion 9 to contact the laminate 8 adjacent a lower portion of the curved edge 4 such that further lateral movement of the second folder bar 6 in towards the support 1 causes the second folder bar 6 to drop beneath the lower surface 7 of the wooden sheet 2 to provide an upward force against the laminate 8. The upward force acts on the laminate 8 to push it hard against the lower surface 7 to facilitate adhesion.

While some preferred forms of the inventions have been described by way of example is should be appreciated that modifications and improvements can occur without departing from the scope of the appended claims.

What is claimed is:

1. A laminated bench top forming machine, comprising:

a first folder bar, a second folder bar, a first contacting part forming part of the first folder bar, and a second contacting part forming part of the second folder bar, the second folder bar having a resilient portion adjacent the second contacting part;

the laminating machine being formed such that when it is in use a laminate is laid across a first part of a surface to be laminated with the laminate, and the first folder bar can then move so that the first contacting part acts directly against the laminate to cause a first portion of the laminate to be forced directly against the surface to fold the first portion of the laminate around a second curved part of the surface, and the second folder bar can then move so that the second contacting part acts against the first portion of the laminate which has been folded and acts against an edge portion of the second curved part such that as this occurs the resilient portion contracts and causes the second contacting part to move around the second curved part of the surface such that the second contacting part applies a force against a third part of the surface, the third part of the surface being substantially opposite the first part of the surface;

the laminating machine being formed such that when it is in use the first and second folder bars act against the laminate independently of one another.

2. A laminated bench top forming machine according to claim 1, wherein the resilient portion facilitates an enhancement of contact between the surface and the second folder bar.

3. A laminated bench top forming machine according to claim 1, wherein the resilient portion comprises a synthetic pad.

4. A laminated bench top forming machine according to claim 1, wherein the first folder bar has a resilient portion adjacent the first contacting part.

5. A laminated bench top forming machine according to claim 1, wherein the first part of the surface is above the third part of the surface.

* * * * *